United States Patent

Tsuda et al.

Patent Number: 5,542,293
Date of Patent: Aug. 6, 1996

[54] PRESSURE DETECTING APPARATUS FOR DETECTING VEHICLE TIRE AIR PRESSURE

[75] Inventors: Hiroshi Tsuda, Obu; Atsushi Iwase; Ken Nomura, both of Okazaki; Kazuma Matsui, Toyohashi, all of Japan

[73] Assignee: Nippondenso Co., Ltd., Kariya, Japan

[21] Appl. No.: 277,763

[22] Filed: Jul. 20, 1994

[30] Foreign Application Priority Data

Jul. 22, 1993 [JP] Japan ................................. 5-181277

[51] Int. Cl.⁶ .......................... B60C 23/02; B60C 23/00; H01H 35/24
[52] U.S. Cl. .................... 73/146.5; 73/146.3; 73/146.4; 73/729.1; 340/442; 340/445; 200/61.25
[58] Field of Search ........................ 73/722, 728, 729.1, 73/146.3, 146.4, 146.5, 723, 745; 200/61.25; 340/442, 445

[56] References Cited

U.S. PATENT DOCUMENTS

| | | | |
|---|---|---|---|
| 3,781,787 | 12/1973 | Sugiyama | 340/445 |
| 3,832,681 | 8/1974 | Kaida et al. | 340/448 |
| 3,925,755 | 12/1975 | Hata | 340/445 |
| 3,977,355 | 8/1976 | Lorenz et al. | 116/34 R |
| 4,119,944 | 10/1978 | Smith | 73/146.5 |
| 4,157,530 | 6/1979 | Merz | 340/445 |
| 4,866,982 | 9/1989 | Gault | 73/146.5 |
| 5,260,683 | 11/1993 | Tanaka et al. | |
| 5,261,273 | 11/1993 | Imani et al. | |

FOREIGN PATENT DOCUMENTS

| | | | |
|---|---|---|---|
| 90407 | 4/1991 | Japan | 340/442 |
| 4-8609 | 1/1992 | Japan . | |
| 4-46808 | 2/1992 | Japan . | |

Primary Examiner—Richard Chilcot
Assistant Examiner—Paul D. Amrozowicz
Attorney, Agent, or Firm—Cushman, Darby & Cushman

[57] ABSTRACT

A pressure detecting apparatus for detecting vehicle tire air pressure. In a cylindrical housing mounted axially in parallel with a tire wheel, a setting magnet, a rotor magnet and a reversing magnet are coaxially provided and the rotor magnet is supported by a shaft rotatably and axially movably in response to a tire air pressure introduced to a bellows in the housing. When the air pressure is normal, the rotor magnet is attracted by the setting magnet. When the air pressure is reduced, the rotor magnet is separated by the movement of bellows, rotated by the repulsion force of the reversing magnet and finally attracted to said reversing magnet. By this operation, position of the magnetic poles of the rotor magnet is reversed and this reversion is detected electrically by a magnetism detecting unit.

16 Claims, 11 Drawing Sheets

PRESSURE DETECTING APPARATUS FOR DETECTING VEHICLE TIRE AIR PRESSURE

BACKGROUND OF THE INVENTION

The present invention relates to a pressure detecting apparatus for detecting a pressure in a pressure chamber, and more particularly to a tire air pressure detecting apparatus for vehicles.

As one of pressure detecting apparatuses, a tire air pressure detecting apparatus is known as disclosed in JP-A-4-8609. In this conventional apparatus, an axial member is operatively coupled to an elastic member which expands and contracts in response to air pressure in a vehicle tire and is supported by a bearing to be axially movable in correspondence to expansion and contraction of the elastic member. A rotor magnet of which upper and lower halves are respectively magnetized to S-pole and N-pole is rotatably mounted around the outer periphery of the axial member. The axial member, bearing and rotor magnet are housed within a housing, and a first and second magnets are fixed adjacently to each other on the outer periphery of the housing in such a manner that respective magnetic poles thereof facing the magnetic poles of the rotor magnet become S-pole and N-pole.

The rotor magnet is so arranged to be positioned closely to the first magnet when the tire air pressure is kept normal and attraction force F1 between the N-pole of the first magnet and the S-pole of the rotor magnet is so set as to be larger than repulsion force F2 between the S-pole of the second magnet and the S-pole of the rotor magnet. Thus, the rotor magnet is held in a stationary condition.

When the tire air pressure is reduced to the extent that the sum F1+F2 exceeds operation force of the elastic member and the axial member is moved to the position that the rotor magnet is close to the second magnet, the attraction force F1 becomes smaller than the repulsion force F2. This repulsion force F2 causes rotation force to the rotor magnet to rotate the rotor magnet.

It may be detected whether the tire air pressure is normal or abnormal by detecting changes in the position of magnetic poles of the rotor magnet caused by the rotation of the rotor magnet.

SUMMARY OF THE INVENTION

It is a primary object of the present invention to provide a pressure detecting apparatus and a tire air pressure detecting apparatus which assures detection of pressure changes in a pressure chamber such as in a vehicle tire.

It is a further object of the present invention to provide a pressure detecting apparatus which is compact in size and is constructed by fewer component parts.

According to the present invention, a pressure in a pressure chamber such as a vehicle tire air pressure chamber is introduced into a pressure responsive member which axially moves in a housing. A rotor magnet rotatably supported around a shaft is attracted by a setting magnet to keep a fixed position of its magnetic poles when the pressure is high enough. By a reversing magnet fixed to the housing, the rotor magnet is separated away from the setting magnet by the movement of the pressure responsive member and rotated to reverse its magnetic pole position until it takes the other fixed position when the pressure is reduced below the normal value. This reversion is detected by a magnetism detecting unit provided outside the housing. The setting magnet may be fixed to the pressure responsive member to be movable therewith or fixed to the housing.

In case the present invention is applied to detect a tire air pressure, the housing is so fixed to a rim of a vehicle wheel as to be axially parallel with the vehicle wheel and the magnetism detecting unit is provided in a fixed relation to a vehicle chassis.

DETAILED DESCRIPTION OF THE PREFERRED EMBODIMENTS

The present invention will be described in detail hereinunder with reference to various embodiments shown in the accompanying drawings.

Figure 1:
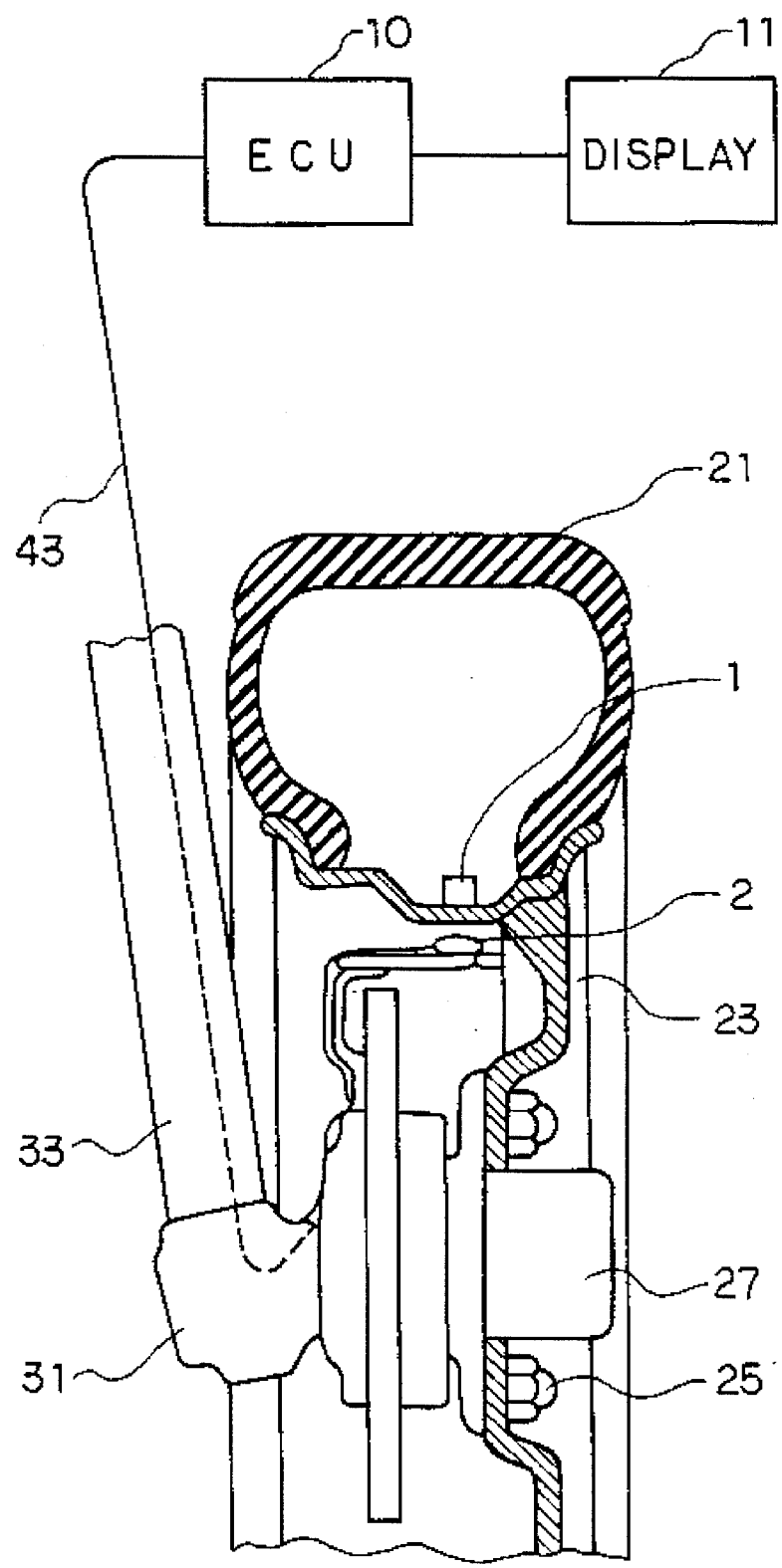
FIG. 1 is a schematic view showing an overall construction of a tire air pressure detecting apparatus according to the first embodiment of the present invention.

In FIG. 1 showing the first embodiment, a vehicle wheel has a rubber tire 21 and a rim 23 coupled to a wheel axle 27 by wheel bolts 25. A shock absorber 33 has a lower end and upper end which are coupled to a hub 31 and vehicle chassis (not shown), respectively. A pressure detecting unit 1 which will be described in detail hereinunder is mounted on the outer periphery of the rim 23 so that it may be positioned within a pressure chamber defined by the tire 21 and the rim 23 and rotated during vehicle running. A magnetism detecting unit 2 is mounted on a stationary part or chassis of the vehicle for detecting and converting magnetism of the pressure detecting unit 1 into an electric signal. An electronic control circuit (ECU) 10 is connected to the magnetism detecting unit 2 through a wire harness 43 to receive the electric signal from the unit 2, and a display unit 11 is connected to the ECU 10 to display detected tire air pressure in response to an output signal from the ECU 10.

Figure 2:
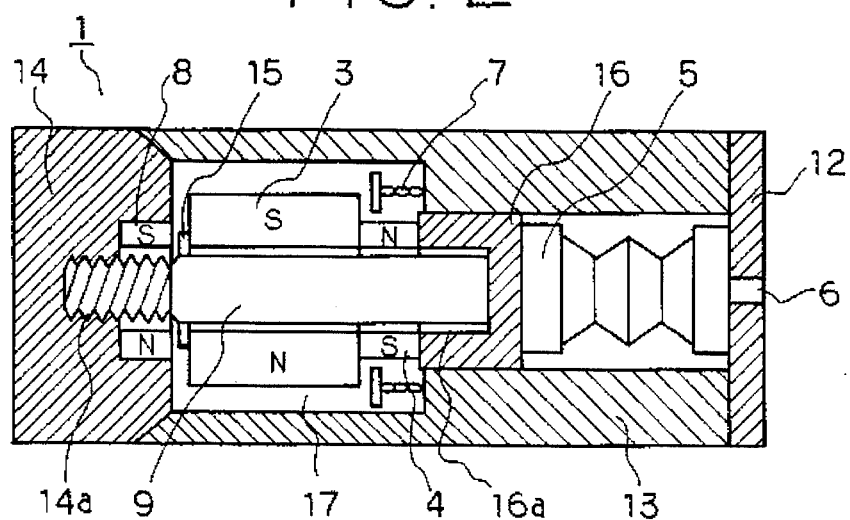
FIG. 2 is a cross sectional view showing a pressure detecting unit shown in FIG. 1.

In the pressure detecting unit 1 shown in detail in FIG. 2, a cylindrical frame 13 and a disk-like flange 12 are welded together and a reference pressure is sealed in an inner pressure chamber 17 of the frame 13. The flange 12 is formed with a through hole 6 to introduce tire air pressure therethrough into an inside chamber of a metallic bellows 5 welded to the flange 12. A guide 16 is welded to the left side of the bellows 5 and a setting magnet 4 of a ring or cylindrical shape is fixedly coupled to the left side of the guide 16, so that the guide 16 and the setting magnet 4 slide axially together within the frame 13 with the expansion and contraction of the bellows 5 which is responsive to changes in the air pressure within the tire. The guide 16 is formed with an axial passage 16a at its left side. A shaft 9 is slidably inserted into the setting magnet 4 and the passage 16a. The passage 16a allows the guide 16 to move axially relative to the shaft 9 when the guide 16 moves axially with the bellows 5. For this, the right end of the shaft 9 is not fixed to the guide 16 and has a smaller diameter than that of the passage 16a to be freely displaced from the guide 16 within the passage 16a. A cylindrical rotor magnet 3 having an inner diameter larger than that of the shaft 9 is rotatably mounted on the outer periphery of the shaft 9.

A cap 14 is formed with an axial passage 14a into which the left end portion of the shaft 9 is screwed. Around the outer periphery of the passage 14a, a reversing magnet 8 of a ring or cylindrical shape is press-fitted or fixed to be held in position within the cap 14. A stopper 15 is coupled to the shaft 9 at the left side of the rotor magnet 3 so that the two magnets 3 and 8 are kept apart from each other by a predetermined distance. A spring 7 is positioned in the pressure chamber 17 and coupled to the frame 13 at its right end to stop axial movement of the rotor magnet 3 and separates by its spring force the rotor magnet 3 from the setting magnet 4, when the rotor magnet 3, setting magnet 4 and guide 16 move together in the rightward direction in the Figure. The detecting unit 1 is so arranged in the tire air pressure chamber that its cylindrical axis is in parallel with an axis of a wheel.

Figure 4:
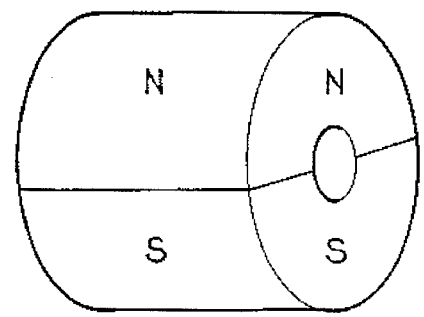
FIG. 4 is a perspective view showing shapes of a rotor magnet, fixed magnets and reversing magnet shown in FIG. 1.

As shown in FIG. 4, the rotor magnet 3, setting magnet 4 and reversing magnet 8 are permanent magnets in cylindrical shape and divided into N-pole and S-pole with respect to the axis the shaft 9 passes through. The setting magnet 4 and the reversing magnet 8 are so arranged that the S-pole and N-pole of the former and the N-pole and S-pole of the latter face to each other, respectively.

Figure 3:
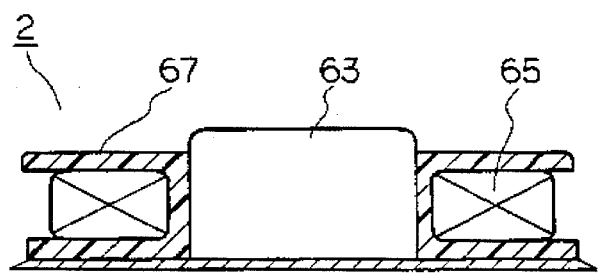
FIG. 3 is a cross sectional view showing a magnetism detecting unit shown in FIG. 1.

In the magnetism detecting unit 2 shown in FIG. 3, a magnetic core 63 is made of iron or nonmagnetized ferrite material and a coil 65 made of insulator-covered conductive wire is wound around a resin bobbin 67 which is positioned around the core 63. This construction of the magnetism detecting unit 2 is known well in the art.

Operation of the above-described first embodiment will be described next with reference to FIGS. 5 through 10.

Figure 5:
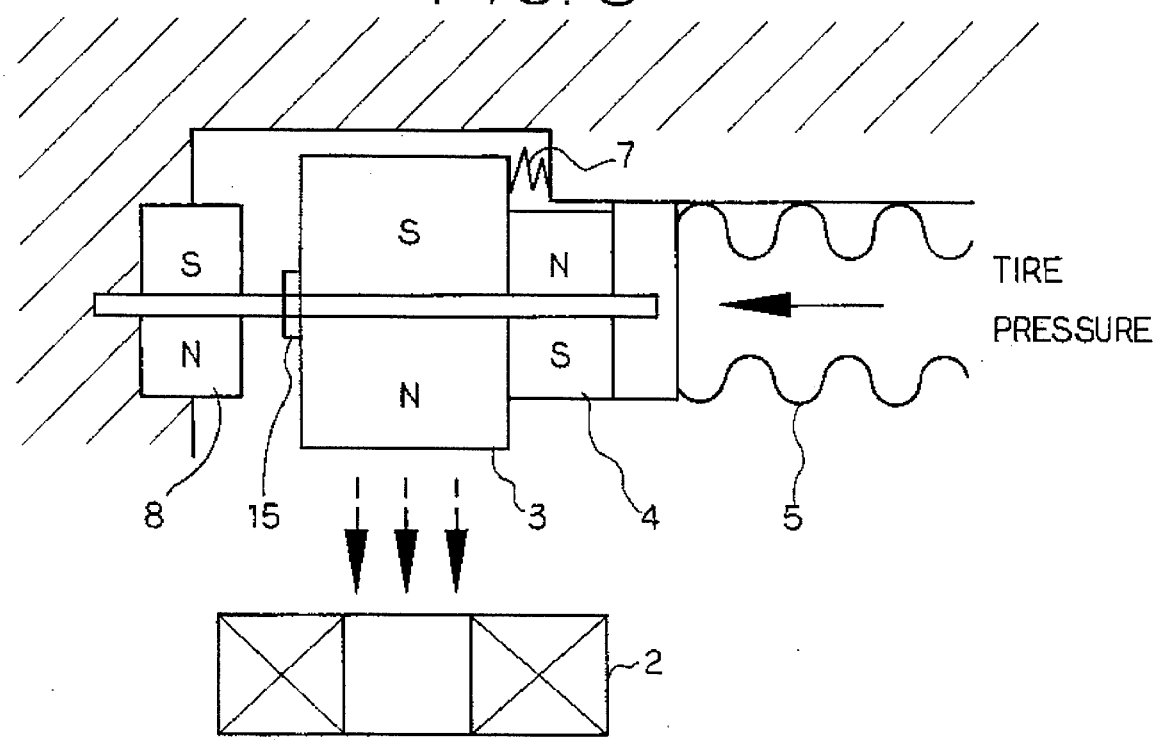
FIGS. 5 through 7 are explanatory views showing operations of the first embodiment.
Figure 6:
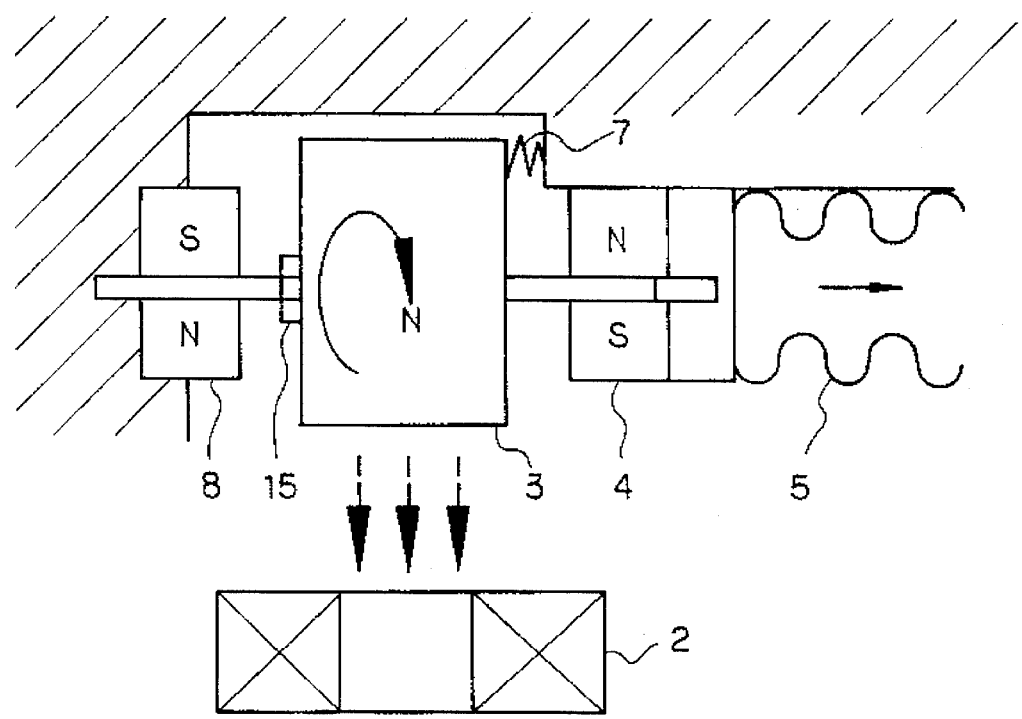
Figure 7:
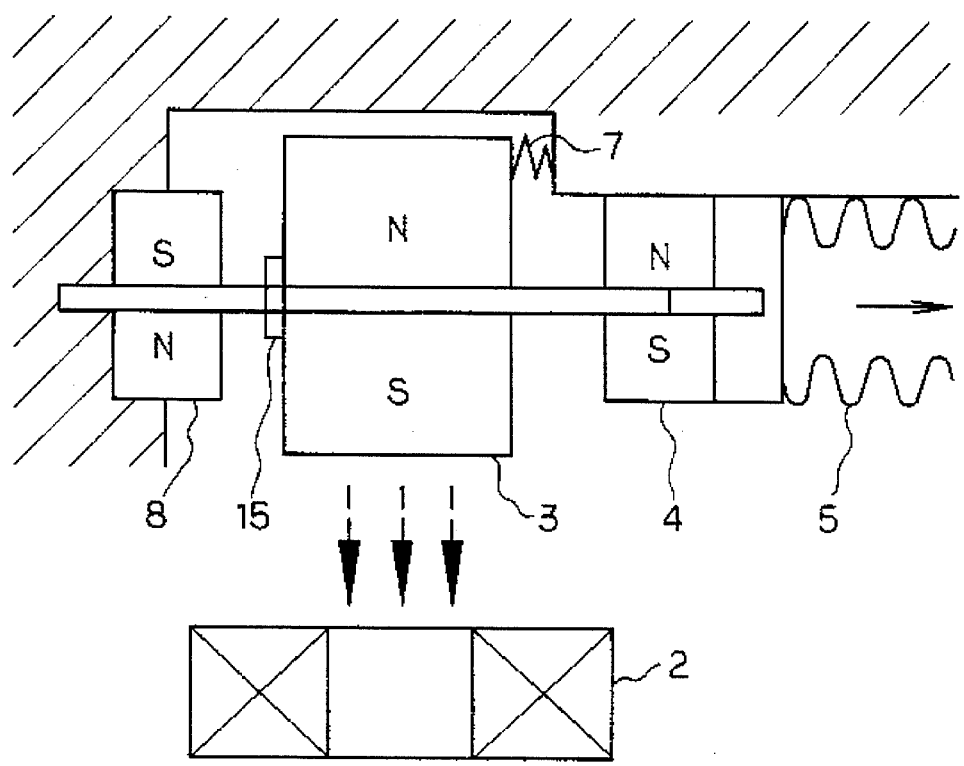
Figure 8:
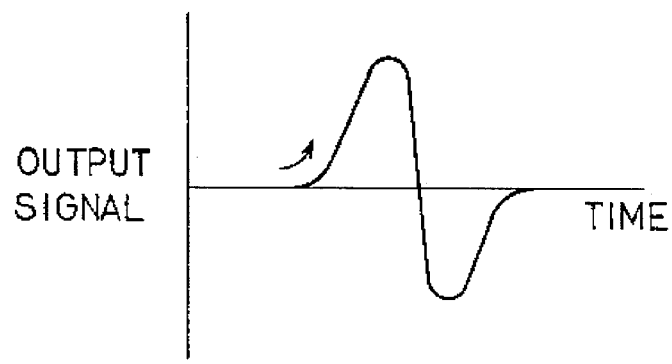
FIGS. 8 through 10 are time charts showing output signals of a magnetism detecting unit shown in FIG. 3.
Figure 9:
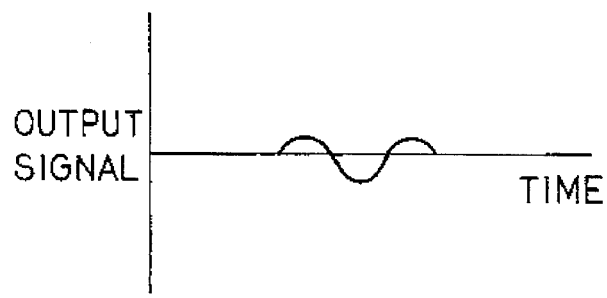
Figure 10:
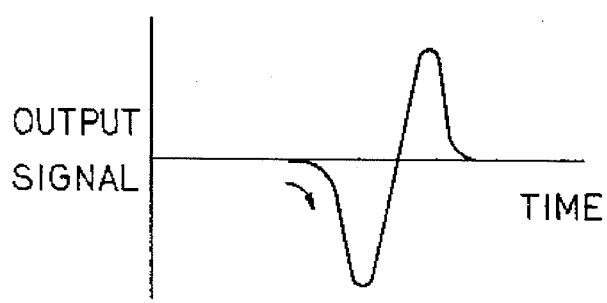

As long as the tire air pressure introduced into the bellows 5 is normal or high enough, the bellows 5 expands to move the guide 16 and the setting magnet 4 together in the leftward direction and the rotor magnet 3 and the setting magnet 4 are kept attracted to each other as shown in FIG. 5. Under this condition, the magnetism detecting unit 2 outputs to the ECU 10 a signal in each tire revolution. As the tire air pressure is reduced, on the other hand, the rotor magnet 3 and fixed magnet 4 are kept attracted to each other and move in the rightward direction in the Figure because of contraction of the bellows 5. With further reduction in the tire air pressure, the rotor magnet 3 moves further axially with the setting magnet 4 to come into contact with and compresses the spring 7. When the spring force of the spring 7 exceeds the attraction force of the magnets 3 and 4, the rotor magnet 3 is separated from the setting magnet 4 by the spring 7. With the rotor magnet 3 moving closer to the reversing magnet 8 than to the setting magnet 4, the rotor magnet 3 starts to rotate by the repulsion force of the reversing magnet 8 as shown in FIGS. 6 and 7. Thereafter, the rotor magnet 3 is attracted in the leftward direction by the attraction force of the reversing magnet 8 until the stopper 15 comes into contact with the reversing magnet 8. In this sequence of operation, the position of magnetic poles of the rotor magnet 3 are reversed and the signal applied from the magnetism detecting unit 2 to the ECU 10 are also changed as shown in FIGS. 9 and 10. This change is detected by the ECU 10 and the display unit 11 is driven to display reduction in the tire air pressure.

If the tire air pressure is increased from the low pressure condition, the bellows 5 expands to move the setting magnet 4 in the leftward direction. With the setting magnet 4 moving closer to the rotor magnet 3, the rotor magnet 3 is rotated by the repulsion force of the setting magnet 4 and then attracted to the setting magnet 4 because of the attraction force of the two magnets 3 and 4. Thus the position of magnetic poles of the rotor magnet 3 is set again to its initial or normal position.

It will be understood that the first embodiment provides the following advantages.

(1) Abnormality of the tire air pressure may be detected as long as the tire is in rotation, because of use of attraction force and repulsion force of the magnets.

(2) Centrifugal force of the tire in rotation will not have an affect on the operation, because the unit 1 is provided axially in parallel with the wheel axis and the rotor magnet 3 is coaxial with and not eccentric from the axis of the shaft 9. Therefore, no force which will rotate the rotor magnet 3 will exert on the rotor magnet 3 during tire rotation and no complicated structure will be necessary to hold the rotor magnet 3 in its stationary position.

(3) Stop position of the rotor magnet 3 in case of restoring the tire air pressure to the normal condition need not be adjusted, because of use of attraction force and repulsion force of the magnets.

(4) Initial reduction in the tire air pressure may be detected as long as it reduces gradually.

Figure 11:
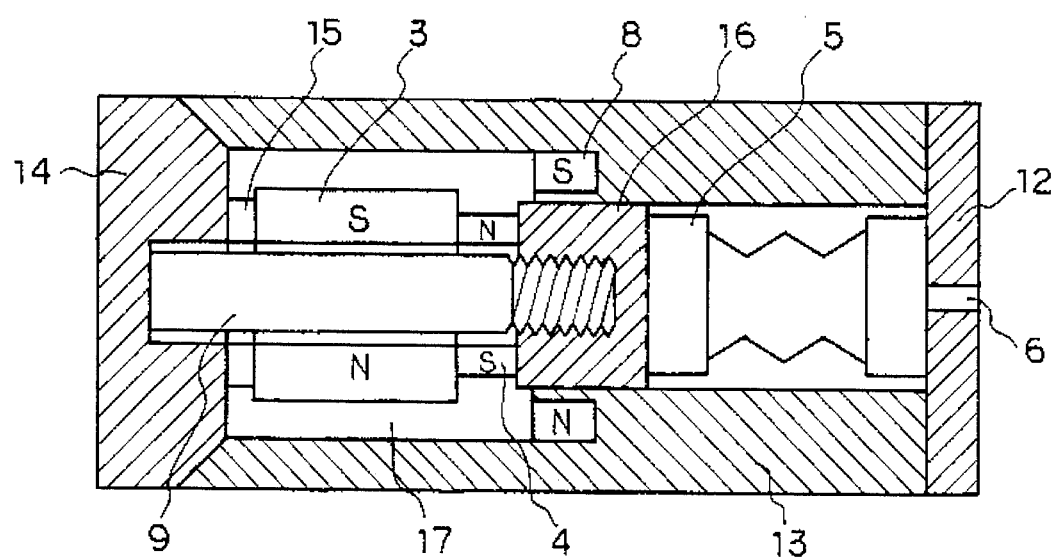
FIG. 11 is a cross sectional view showing a pressure detecting unit according to the second embodiment of the present invention.

In the second embodiment, as shown in FIG. 11, the reversing magnet 8 is press-fitted axially into the frame 13 at the right side wall of the pressure chamber 17 and the shaft 9 is threaded into the guide 16. By this arrangement no spring will be necessitated, because the rotor magnet 3 is separated from the setting magnet 4 by the repulsion force of the reversing magnet when it moves rightwardly to be close enough to the reversing magnet 8.

Figure 12:
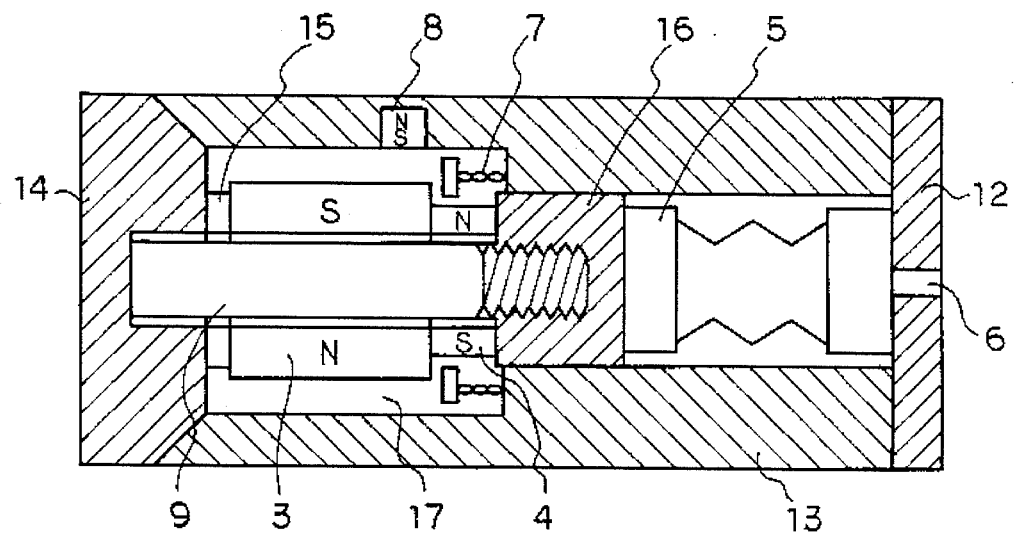
FIG. 12 is a cross sectional view showing a pressure detecting unit according to the third embodiment of the present invention.

In the third embodiment, as shown in FIG. 12, the reversing magnet 8 is positioned at the outer periphery of the pressure chamber 17.

Figure 13:
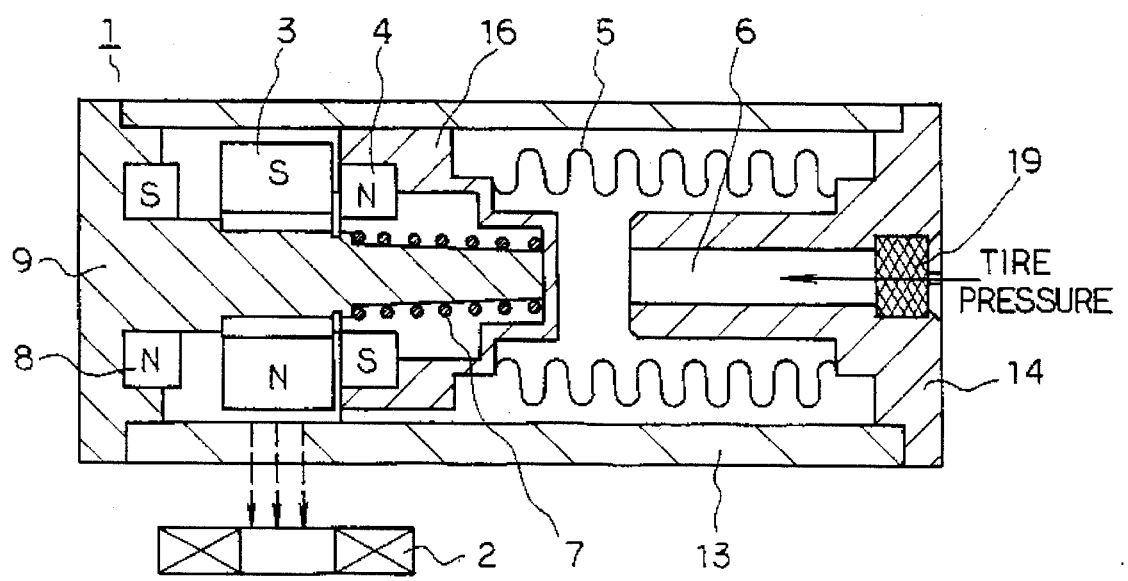
FIG. 13 is a cross sectional view showing a pressure detecting unit according to the fourth embodiment of the present invention.

In the fourth embodiment, as shown in FIG. 13, the shaft 9, frame 13 and cap 14 are welded together and the bellows 5 is welded to the cap 14 and the axially slidable guide 16. The rotor magnet 3 is restricted to move in the rightward direction by a stopper on the shaft 9. The setting magnet 4 and the reversing magnet 8 are fixed to the guide 16 and the shaft 9, respectively, in such a manner that the positions of magnetic poles of the respective magnets 3, 4 and 8 are in the same relation as in the foregoing embodiments. The spring 7 is interposed between the guide 16 and the shaft 9. A filter 19 is disposed in a through hole 6.

Figure 14:
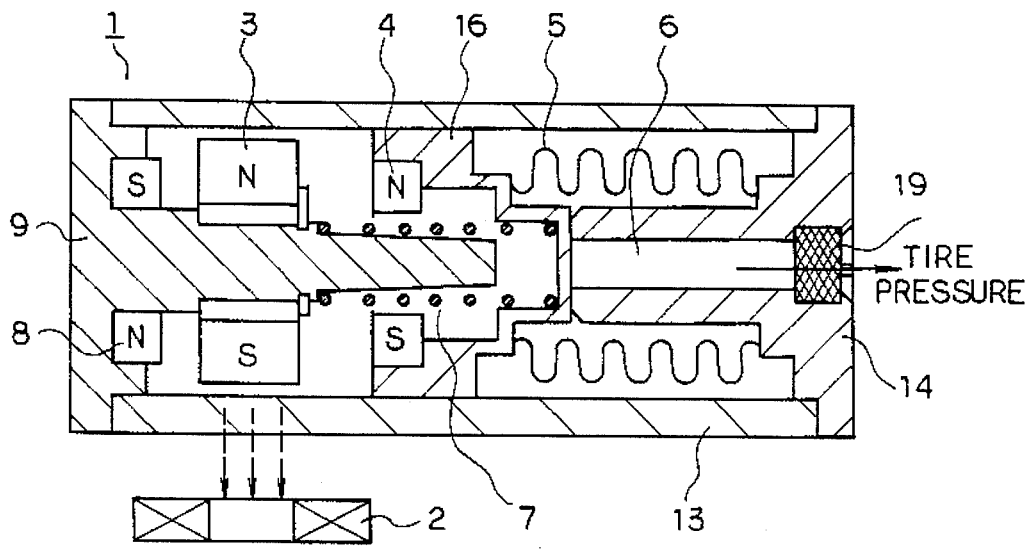
FIG. 14 is an explanatory view showing operation of the fourth embodiment.

Operation of the fourth embodiment will be described with reference to FIGS. 13 and 14.

As long as the tire air pressure is kept normal, the bellows 5 into which the tire air pressure is introduced through the filter 19 is in the expanded condition to compress the spring 7 and the rotor magnet 3 and the setting magnet 4 are attracted to each other.

In case of reduction in the tire air pressure, on the other hand, the bellows 5 contracts to move axially the setting magnet 4 integrally with the guide 16 in the rightward direction by the return force of the spring 7. The axial rightward movement of the rotor magnet 3 is restricted by the stopper of the shaft 9. By this movement of the setting magnet 4 away from the rotor magnet 3, the rotor magnet 3 starts to rotate by the repulsion force of the reversing magnet 8 and then the rotor magnet 3 is held in position by the attraction force of the reversing magnet 8 as shown in FIG. 14. In this operation sequence, the signal applied from the magnetism detecting unit 2 to the ECU 10 is changed as shown from in FIG. 8 through FIG. 9 to FIG. 10, whereby reduction in the tire air pressure is detected in the same way as in the foregoing embodiments. The same operation is attained in the fourth embodiment as in the foregoing embodiments in case the tire air pressure is restored to the normal condition and hence no further detailed description will be made for brevity.

Figure 27:
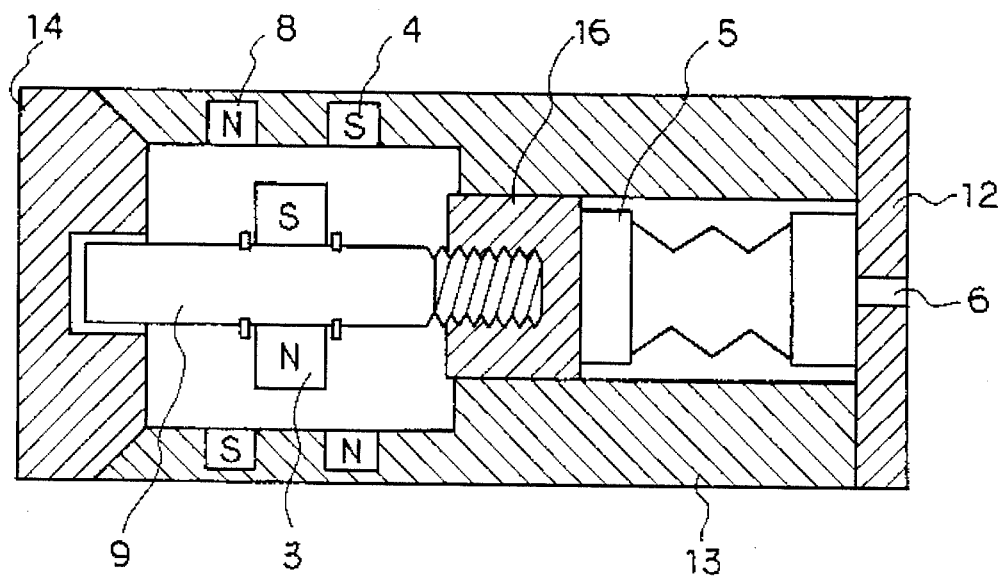
FIG. 27 is a cross sectional view showing a pressure detecting unit according to the fifth embodiment of the present invention.

In the fifth embodiment shown in FIG. 27, which is a modification of the second embodiment of FIG. 11, the end of the shaft 9 is screwed into the guide 16 so that the shaft 9 is operatively connected to be responsive to the movement of the bellows 5 as in the second embodiment. However, the setting magnet 4 and the reversing magnet 8 which are in the same cylindrical shape are fixed side by side into the inner peripheral wall of the frame 13 with the axial spacing therebetween. The relation of the magnets 3, 4 and 8 are so determined that the axial side end faces of the rotor magnet 3 may be aligned radially with the axially opposing end faces of the magnets 4 and 8. It will be understood that this embodiment will also operate in the same manner as in the second embodiments.

The foregoing embodiments may be modified in various ways as exemplified hereinunder.

(1) Air tightness of the pressure chamber 17 may be formed by adhesion or caulking in place of welding.

(2) The bellows 5 may be so arranged as to contract and expand when the tire air pressure is normal and reduced, respectively. That is, it may take the condition of FIG. 7 in case of normal air pressure and the condition of FIG. 5 in case of reduction in the air pressure.

(4) In the first, third and fourth embodiments, threshold air pressure at which magnetic poles of the rotor magnet 3 is reversed and tire air pressure reduction warning is displayed may be arbitrarily set by varying the spring constant of the spring 7. Since the spring 7 provides the load balanced with the tire air pressure, stable movement of the setting magnet 4 is assured and accurate warning pressure may be obtained.

Figure 15:
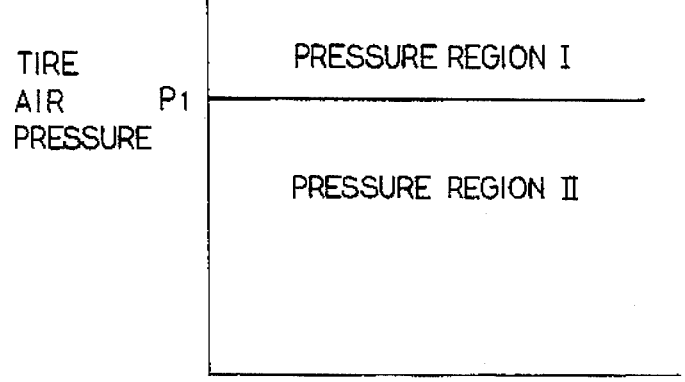
FIG. 15 is a characteristic chart showing pressure sensing regions in case of dividing pressure into two regions.
Figure 16:
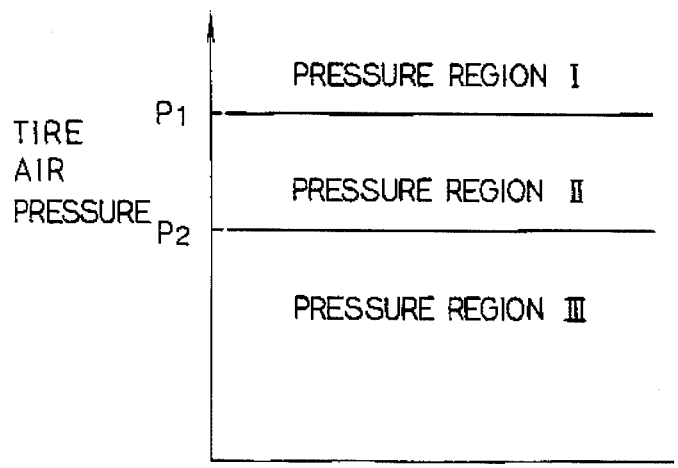
FIG. 16 is a characteristic chart showing pressure sensing regions in case of dividing pressure into three regions.

(5) The foregoing embodiments are directed to detect as shown in FIG. 15 whether the tire air pressure is in the high pressure region I or in the low pressure region II with respect to the reference or threshold pressure P1 determined by the spring constant of the spring 7. If more accurate pressure detection such as three regions I, II and III shown in FIG. 16 is desired, for instance, two pressure detecting units may be used. That is, two pressure detecting units 1a and 1b which have respective threshold pressure values P1 and P2 (P1>P2) may be mounted on the rim 23.

Figure 17:
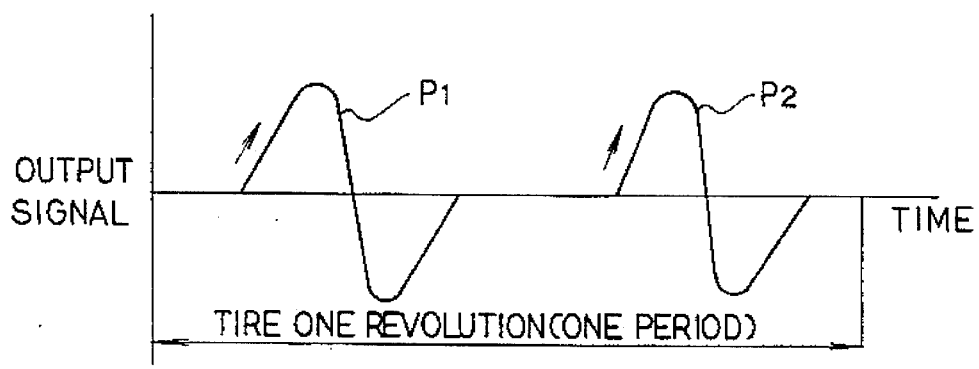
FIGS. 17 through 19 are time charts showing output signals of the magnetism detecting unit.
Figure 18:
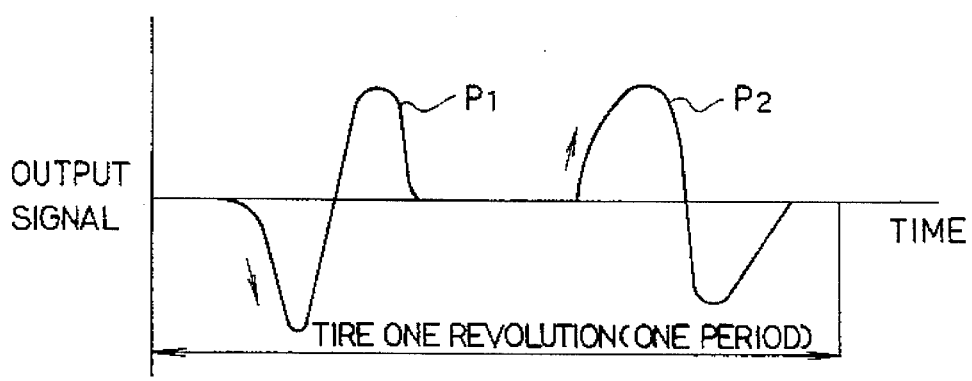
Figure 19:
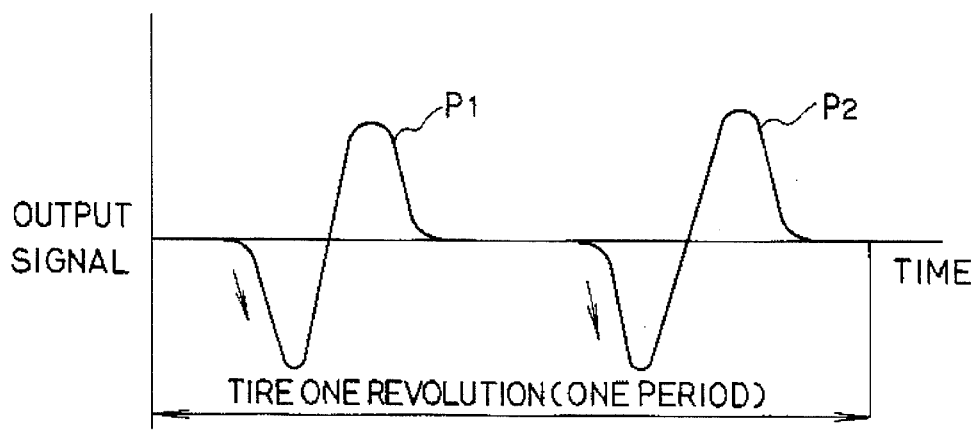

In FIG. 16, since both the pressure detecting units 1a and 1b operate in the normal pressure condition in the pressure region I, the signal produced from the magnetism detecting unit 2 per one revolution of the tire results in the waveform shown in FIG. 17. Next, in the pressure region II, the pressure detecting unit 1a operates in the reduced pressure (abnormal pressure) condition, while the pressure detecting unit 1b operates in the normal pressure region. The signal from the magnetism detecting unit 2 per one revolution results in the waveform shown in FIG. 18. Further in the pressure region III, both the pressure detecting units 1a and 1b operate in the reduced pressure condition, the signal produced from the magnetism detecting unit 2 per one revolution of tire results in the waveform shown in FIG. 19. Accordingly, tire pressure may be detected more precisely by judging from the waveforms of the signals produced from the magnetism detecting unit 2 during tire rotation in which region of FIG. 16 the tire air pressure is.

Figure 20:
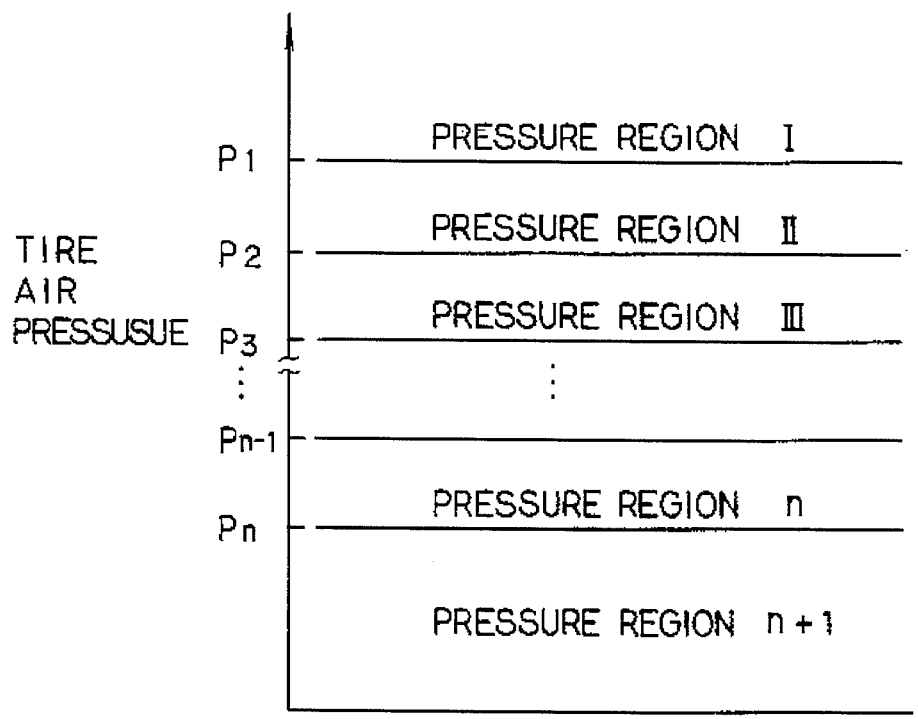
FIG. 20 is a characteristic chart showing pressure regions in case of dividing pressure into n regions.

With a plurality (n) of pressure detecting units 1 mounted on the rim 23 and adapted to have respective threshold pressure values P1, P2—Pn, pressure regions of n+1 may be detected as shown in FIG. 20.

Figure 21:
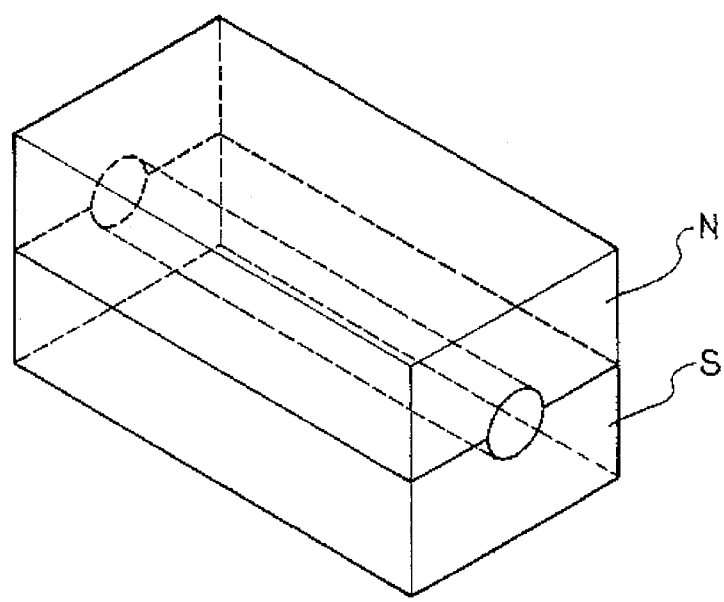
FIG. 21 through 25 are perspective views showing rotor magnets according to other embodiments of the present invention.
Figure 22:
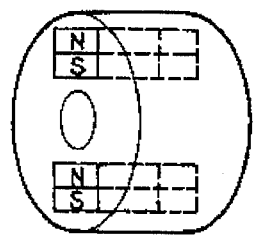
Figure 23:
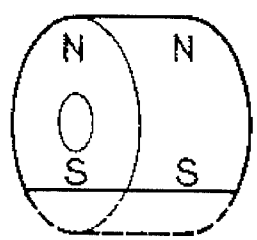
Figure 24:
Figure 25:
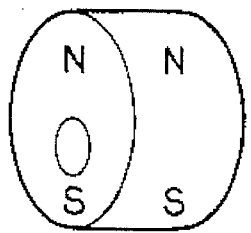

(6) The rotor magnet 3 need not be in cylindrical shape but may be in any other shape as far as the magnetic poles are divided with respect to the direction the shaft passes. For instance, as shown in FIG. 21, it may be in a rectangular body shape or in a multiangular body shape. As shown in FIG. 22, a plurality of magnets may be arranged. Further, in order to help rotation of the rotor magnet even under the centrifugal force exerted thereon, it may be in a partly cut-out shape as shown in FIG. 23 or in a longitudinal or cylindrical magnet shape having an eccentric rotation axis as shown in FIG. 24 or FIG. 25.

Figure 26:
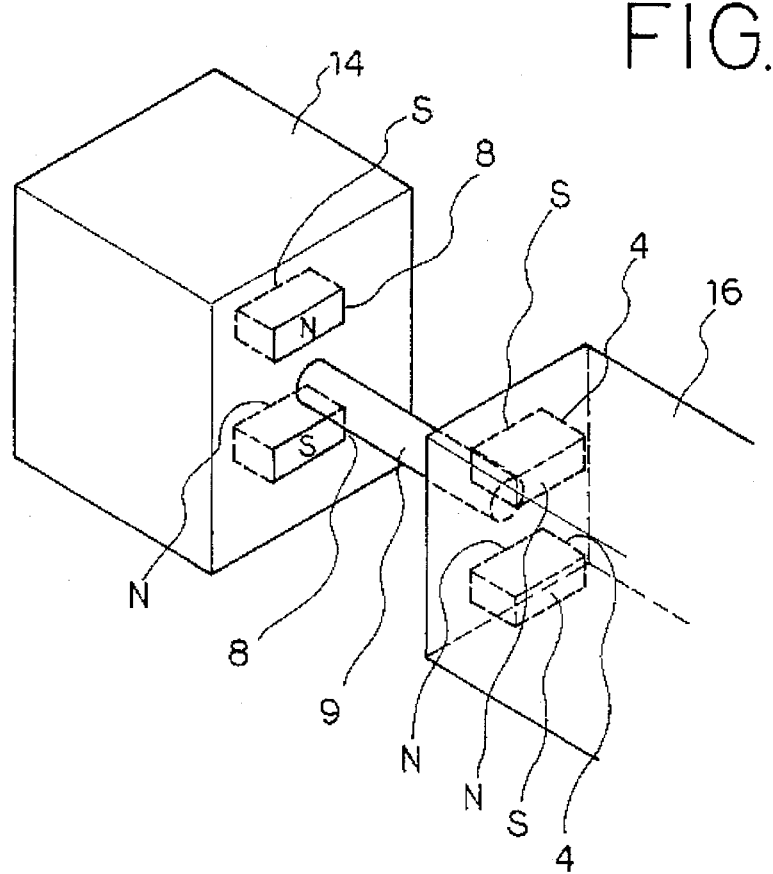
FIG. 26 is a perspective view showing the other arrangement of a fixed magnet and a reversing magnet.

(7) Each of fixed magnet 4 and reversing magnet 8 may be constructed by a plurality of magnets as shown in FIG. 26, as far as the polarities of the magnets axially facing to each other are opposite.

We claim:

1. A pressure detecting apparatus comprising:

pressure responsive means arranged to be movable in response to a pressure applied thereto;

setting magnet means having its magnetic poles;

reversing magnet means having its magnetic poles positioned in opposite relation to said setting magnet means and being spaced apart from said setting magnet means;

rotor magnet means supported rotatably relative to said setting magnet means and said reversing magnet means, said rotor magnet means being attracted by said setting magnet means so that position of its magnetic poles is kept in a first position when said pressure responsive means moves in a first direction, and said rotor magnet means being repelled by said reversing magnet means to rotate so that position of its magnetic poles is reversed to a second position opposite to said first position when said pressure responsive means moves in a second direction opposite to said first direction;

magnetism detecting means for detecting and producing a signal indicative of a change in position of said magnetic poles of said rotor magnet means;

cylindrical housing means encasing therein said pressure responsive means, said setting magnet means, said reversing magnet means and said rotor magnet means; and shaft means arranged coaxially within said housing means and supporting thereon said rotor magnet means rotatably;

wherein said rotor magnet means is shaped in a cylindrical form coaxial with said shaft means, said setting magnet means is shaped in a cylindrical form and positioned coaxially with said shaft means, and said reversing magnet means is fixed to said housing means;

wherein said setting magnet means is fixed to said pressure responsive means to be movable therewith.

2. A pressure detecting apparatus according to claim 1, wherein said reversing magnet means is shaped in a cylindrical form and fixed at a position opposite to said pressure responsive means so that said rotor magnet means is axially interposed therebetween, and said shaft means is fixed to said housing means at its one end in the vicinity of said reversing magnet means.

3. A pressure detecting apparatus according to claim 1, wherein said reversing magnet means is fixed at a position in the vicinity of said pressure responsive means, and said shaft means is fixed to said pressure responsive means at its one end in the vicinity of said reversing magnet means.

4. A pressure detecting apparatus according to claim 1 further comprising:

spring means positioned within said housing means for separating said rotor magnet means from said setting magnet means against attractive force of said setting magnet means when said pressure responsive means moves in said second direction.

5. A pressure detecting apparatus according to claim 1, wherein said housing means is mounted in an air pressure chamber defined by a tire and a rim of a vehicle wheel.

6. A pressure detecting apparatus according to claim 5, wherein said housing means is so positioned as to be in axially parallel with said vehicle wheel.

7. A pressure detecting apparatus for detecting a pressure in a pressure chamber comprising:

pressure responsive means movable in response to pressure in said pressure chamber;

a setting magnet;

a rotor magnet supported rotatably and arranged to be attracted to and repelled from said setting magnet depending on a distance relative to said setting magnet; and a reversing magnet arranged to reverse rotary position of said rotor magnet when the rotor magnet is moved away from said setting magnet, wherein said setting magnet is arranged to move with said pressure responsive means and said rotor magnet is arranged substantially coaxially with said reversing magnet.

8. A pressure detecting apparatus according to claim 7, wherein said pressure responsive means includes:

an expansion-contraction member which receives thereinto said pressure from said pressure chamber and expands and contracts in predetermined direction in response to said pressure; and a guide fixedly coupled to said expansion-contraction member and said setting magnet.

9. A pressure detecting apparatus according to claim 8, wherein an inner chamber of said expansion-contraction member is in communication with said pressure chamber.

10. A pressure detecting apparatus according to claim 9 further comprising:

a shaft fixedly coupled to said guide to be movable axially together with said setting magnet in response to movement of said expansion-contraction member, said shaft supporting said rotor magnet rotatably therearound.

11. A pressure detecting apparatus according to claim 10, wherein said setting magnet is in a cylindrical shape, positioned around said shaft coaxially therewith and fixed to said guide.

12. A pressure detecting apparatus according to claim 11 further comprising:

bearing means formed by an axial hole in said rotor magnet for receiving said shaft axially movably therein.

13. A pressure detecting apparatus for detecting a pressure in a pressure chamber comprising:

a cylindrical housing closed to form an inner chamber and having a hole to introduce pressure from said pressure chamber;

a pressure responsive member arranged within said inner chamber of said housing to be movable axially in response to pressure introduced thereto through said hole;

a setting magnet arranged within said inner chamber of said housing and fixed to said pressure responsive means to be movable axially with said pressure responsive member;

a shaft arranged within said inner chamber of said housing;

a rotor magnet rotatably supported around said shaft in said inner chamber so that magnetic poles thereof are reversed and restored by magnetic force, said rotor magnet being positioned coaxially with said setting magnet so that it is attracted to and separated from said setting magnet depending on change of distance to said setting magnet caused by the movement of said setting magnet; and a reversing magnet fixed to said housing within said inner chamber of said housing and arranged to reverse pole positions of said rotor magnet by rotation when said rotor magnet is separated from said setting magnet.

14. A pressure detecting apparatus according to claim 13 further comprising:

a spring arranged within said inner chamber of said housing to produce spring force in a direction to separate said setting magnet from said rotor magnet.

15. A pressure detecting apparatus according to claim 14 wherein said setting magnet, said rotor magnet and said reversing magnet are shaped in cylindrical shape and positioned coaxially with said shaft, and wherein said housing is mounted on a rim of a vehicle wheel axially parallelly with said vehicle wheel.

16. A tire air pressure detecting apparatus for a tire having an air pressure chamber, said apparatus comprising:

a housing fixedly positioned in said air pressure chamber of said tire;

a shaft disposed in and fixed to said housing to extend in parallel with a rotary axis of said tire;

a rotor magnet rotatably supported on said shaft;

a pressure responsive member disposed in said housing and movable, in response to a pressure in said air pressure chamber, in a direction said shaft extends;

a setting magnet fixed to said pressure responsive member and movable to and away from said rotor magnet to rotate said rotor magnet in a first rotary direction;

a reversing magnet fixed to said housing to rotate said rotor magnet in a second rotary direction opposite to said first direction; and a magnetism detector positioned outside and in a fixed relation with said housing to be responsive to a change in the magnetism caused by the rotation of said rotary magnet.

* * * * *